No. 892,063. PATENTED JUNE 30, 1908.
O. S. LEE.
VEHICLE BRAKE.
APPLICATION FILED FEB. 28, 1908.
2 SHEETS—SHEET 1.
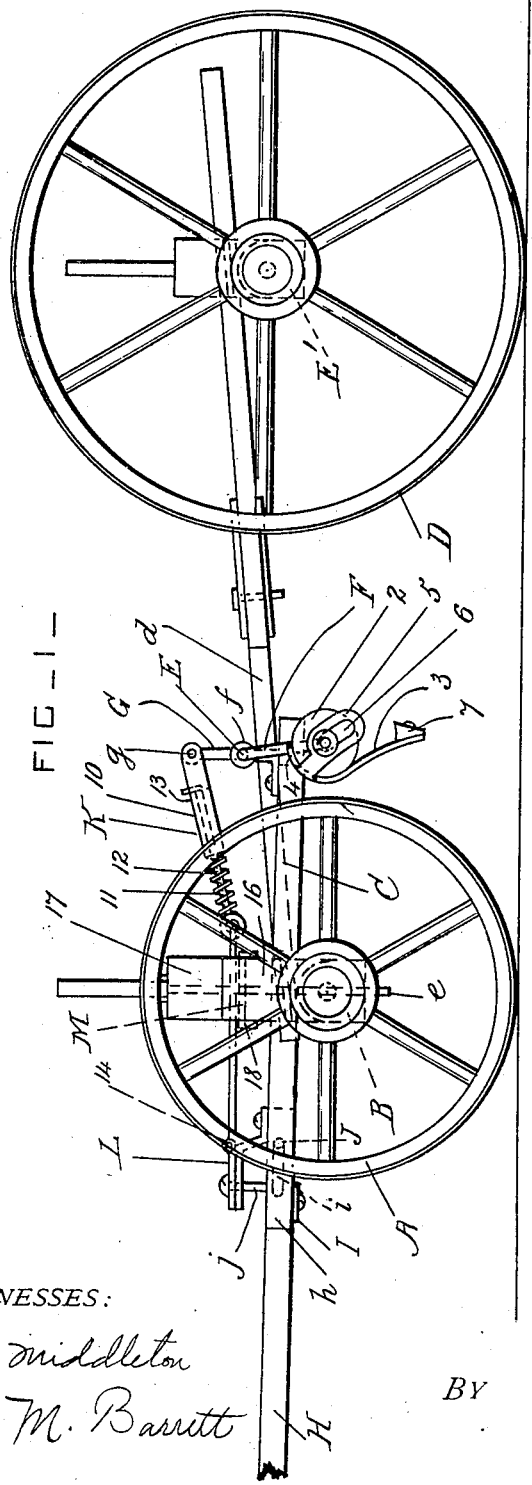
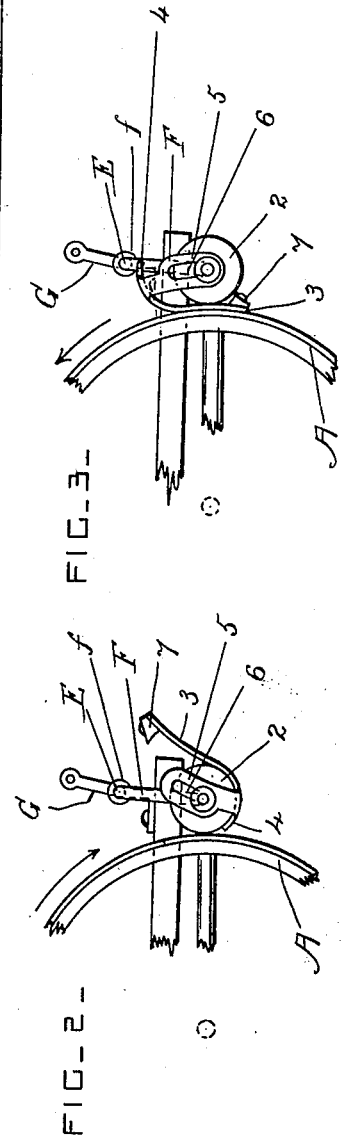
WITNESSES:
L. B. Middleton
H. M. Barritt
INVENTOR
Orlan S. Lee.
BY
Herbert W. Jenner.
Attorney

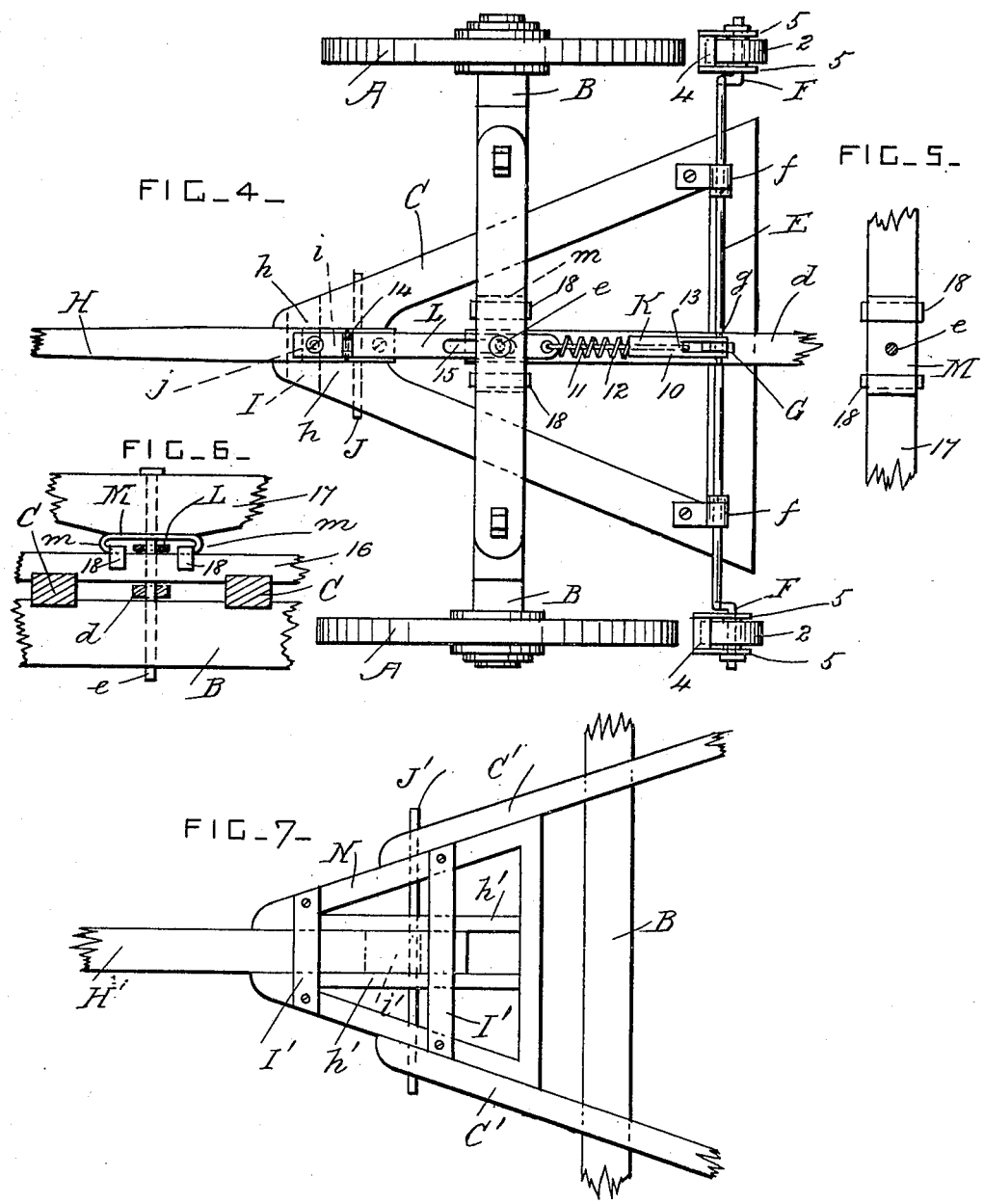

UNITED STATES PATENT OFFICE.

ORLAN S. LEE, OF TERRE HAUTE, INDIANA.

VEHICLE-BRAKE.

No. 892,063.　　　　Specification of Letters Patent.　　　Patented June 30, 1908.

Application filed February 28, 1908. Serial No. 418,227.

*To all whom it may concern:*

Be it known that I, ORLAN S. LEE, a citizen of the United States, residing at Terre Haute, in the county of Vigo and State of Indiana, have invented certain new and useful Improvements in Vehicle-Brakes; and I do hereby declare the following to be a full, clear, and exact description of the invention, such as will enable others skilled in the art to which it appertains to make and use the same.

This invention relates to brakes for wagons; and it consists in the novel construction and combination of the parts hereinafter fully described and claimed.

In the drawings, Figure 1 is a side view of a wagon provided with brake mechanism according to this invention. Fig. 2 is a detail side view of the brake-shoe showing its position when the wagon is being backed. Fig. 3 is a similar side view showing the position of the brake-shoe when the wagon is descending a hill. Fig. 4 is a plan view of the front portion of the wagon. Fig. 5 is a detail plan view, from below of the bracket which supports the bolster. Fig. 6 is an end view of the same. Fig. 7 is a plan view of the hounds, showing a modification.

A are the front road-wheels of a wagon of any approved construction journaled on the end portions of an axle B, and C are the hounds secured to the axle B.

D are the rear road-wheels mounted on an axle E′, and *d* is a reach-bar secured to the rear axle and having its front end pivoted to the front axle B by a pin *e*. The remaining parts of the wagon are of any approved construction.

E is the brake-shaft provided with cranks F at its ends and journaled in bearings *f* secured to the rear portions of the hounds C. An arm G projects upwardly from the middle part of the brake-shaft.

A roller 2 is journaled on each crank F, and 3 is a brake-shoe normally arranged between the roller 2 and the tire of the road-wheel. This shoe has a curved upper portion 4 which engages with the periphery of the roller, and its lower portion is curved slightly in the opposite direction from the part 4 so as to bear against the wheel tire. Arms 5 project from the shoe, at its sides, and are provided with slots 6 which are slidable on the crank F. The slots 6 are substantially radial of the curved portions 4 and are substantially parallel with the lower portion of the brake-shoe, and a stop 7 is secured to the said shoe at its lower end.

H is the draft-pole of the wagon which is slidable longitudinally in the hounds. In the wagon shown in Figs. 1 and 4, the hounds C are provided with guides *h* for the pole to slide in, and a plate I is secured to the hounds under the pole. A pin J is secured in the hounds behind the plate I, and the pole is provided with a slot *i* which slides over the pin J.

K is a spring-controlled bar the front end of which is pivoted to the arm G by a pin *g*. This spring-controlled bar is preferably composed of a front section 10, a rear section 11 which slides telescopically in the front section, and a spiral spring 12 interposed between the said sections and permitting them to be pushed together to a limited extent. The section 10 is provided with a stop 13 which engages with the front section and which prevents the sections from being pulled apart.

L is a bar pivoted to the draft-pole by a pin *j*, and having its rear end pivotally connected with the spring-controlled bar K. The bar L is provided with a hinge or joint 14 in its front end portion, so as to permit the draft-pole to be moved pivotally upward to a limited extent in a vertical plane. The bar L is also provided with a longitudinal slot 15 which slides over the pin *e*.

M is a bracket interposed between the crossbar 16 of the hounds and the bolster 17. This bracket M has inwardly-folded end-portions *m* which rest on the crossbar 16, and lugs 18 at the edges of the parts *m* which straddle the said crossbar. The pin *e* passes through the bolster, crossbar, and axle, and the space between the parts *m* forms a channel for the bar L to slide in.

When the wagon is backed on level ground, the draft-pole is slid rearwardly in the hounds, thereby partially revolving the brake-shaft and applying the brake-shoes. The motion of the wheels, in the direction of the arrow in Fig. 2, turns the brake-shoes to the position shown in Fig. 2, and the roller 2 runs on the tire of the wheel and exerts a slight brake action, which is desirable. The spring 12 enables the braking-devices to bear against the wheels with a yielding or elastic pressure.

When the wagon descends a steep hill, the hounds slide forward on the draft-pole, and the brake-shoes are applied to the wheels.

The wheels however revolve in the direction of the arrow in Fig. 3, and the brake shoes are drawn upwardly between the rollers and the wheel tires, and exert a powerful brake action, which is requisite. The stop on the lower end of the brake-shoe bears against the roller and prevents the brake-shoe from being moved too far in an upward direction.

In the modification shown in Fig. 7, the draft-pole H' is slidable longitudinally in contact with plates I' and between guides h' which are formed on a frame N instead of being formed on the wagon hounds. The frame N is pivoted to the wagon hounds C' by a pin J', and the draft-pole is provided with a slot i' which slides over the pin J'. In this modified construction the draft-pole can be moved downwardly in a vertical plane, and can be moved upwardly to a greater extent than in the construction shown in Figs. 1 and 4.

What I claim is:

1. The combination, with a road-wheel, of a brake-shaft provided with a crank, a roller journaled on the said crank, a slidable shoe provided with a curved portion which engages with the periphery of the said roller and having side portions provided with slots which are slidable on the said crank, and means for pressing the said roller towards the said wheel, said shoe being slid upon the said roller by contact with the said wheel according to the direction of its revolution.

2. The combination, with a road-wheel, of a brake-shaft provided with a crank, a roller journaled on the said crank, a slidable shoe provided with a curved portion at its upper part which engages with the said roller, and having a curved portion at its lower part for engaging with the said road-wheel, and having also a stop at its lower end for engaging with the said roller and side portions having slots which are slidable on the said crank, and means for pressing the said roller towards the said wheel.

3. The combination, with an axle and road-wheels, of a brake-shaft supported by the said axle and provided with a crank, a roller journaled on the said crank, a slidable shoe provided with a curved portion which engages with the periphery of the said roller and which has slotted side portions which are slidable on the said crank, a draft-attachment slidably connected with the said axle, and connecting-devices arranged between the said draft-connection and brake-shaft and operating to move the said roller towards the said wheel when the said draft-attachment is pressed rearwardly, said shoe being slid upon the said roller by contact with the said wheel according to the direction of its revolution.

In testimony whereof I have affixed my signature in the presence of two witnesses.

ORLAN S. LEE.

Witnesses:
MARCUS DYER,
J. R. MULLIKIN.